Dec. 31, 1957 F. S. MACKLEM 2,818,211

NAVIGATIONAL COMPUTER AND PLOTTER FOR A MERCATOR PROJECTION

Filed March 15, 1955 3 Sheets-Sheet 1

INVENTOR
F. SUTHERLAND MACKLEM

BY R. I. Tompkins
ATTORNEYS

INVENTOR
F. SUTHERLAND MACKLEM
BY
R. I. Tompkins
ATTORNEYS

Dec. 31, 1957 F. S. MACKLEM 2,818,211

NAVIGATIONAL COMPUTER AND PLOTTER FOR A MERCATOR PROJECTION

Filed March 15, 1955 3 Sheets-Sheet 3

INVENTOR
F. SUTHERLAND MACKLEM

BY [signature]
R. I. Tompkins
ATTORNEYS

United States Patent Office 2,818,211

Patented Dec. 31, 1957

2,818,211

NAVIGATIONAL COMPUTER AND PLOTTER FOR A MERCATOR PROJECTION

F. Sutherland Macklem, Freeport, N. Y., assignor, by mesne assignments, to the United States of America as represented by the Secretary of the Navy Application March 15, 1955, Serial No. 494,581

11 Claims. (Cl. 235—61)

The present invention relates to computers and more particularly relates to a computer for translating rectangular-coordinate data into Mercator-projection coordinate data, with provision for extraction and indication of spherical-coordinate data.

In an important application of the inventive computer, the chart or plotting surface for any single plot covers only a small fractional area of the total Mercator projection of the world, within the limits 75° north latitude to 75° south latitude; thus, the coordinates supplied to the chart-drive mechanism must be Mercator-projection coordinates.

An airplane (or other vehicle whose course is to be plotted) can provide a continuous flow of data in rectangular-coordinate form, representing displacement in miles or velocity in miles per hour along the north-south component, and corresponding displacements and velocities along the east-west component. If the rectangular-displacement data alone were to to be transposed to a plotting surface with the object of following the Mercator projection, one solution would result from accepting the east-west component of displacement before accepting the north-south component of displacement, whereas another solution would result if the north-south component of displacement were accepted before the east-west component. The correct solution is approached only insofar as the computer mechanism is able to operate continuously and solely on the east-west and north-south velocity components as distinguished from the displacement components.

Accordingly an object of the invention is to provide a computer capable of translating rectangular-coordinate data into Mercator-projection coordinate data.

Another object of the invention is to provide a relatively simple and compact computer for translating rectangular-coordinate data into Mercator-projection coordinate data, with provision for extraction and indication of spherical-coordinate data and which will be suitable for airborne use.

Another object of the invention is to provide a computer for use with charts or plotting surfaces wherein a single plot covers only a small fractional area of the total Mercator-projection of the world and capable of supplying Mercator-projection coordinates to the chart-drive mechanism.

Another object of the invention is to provide computer mechanism capable of operating continuously and solely on east-west and north-south velocity components.

Figure 1A:
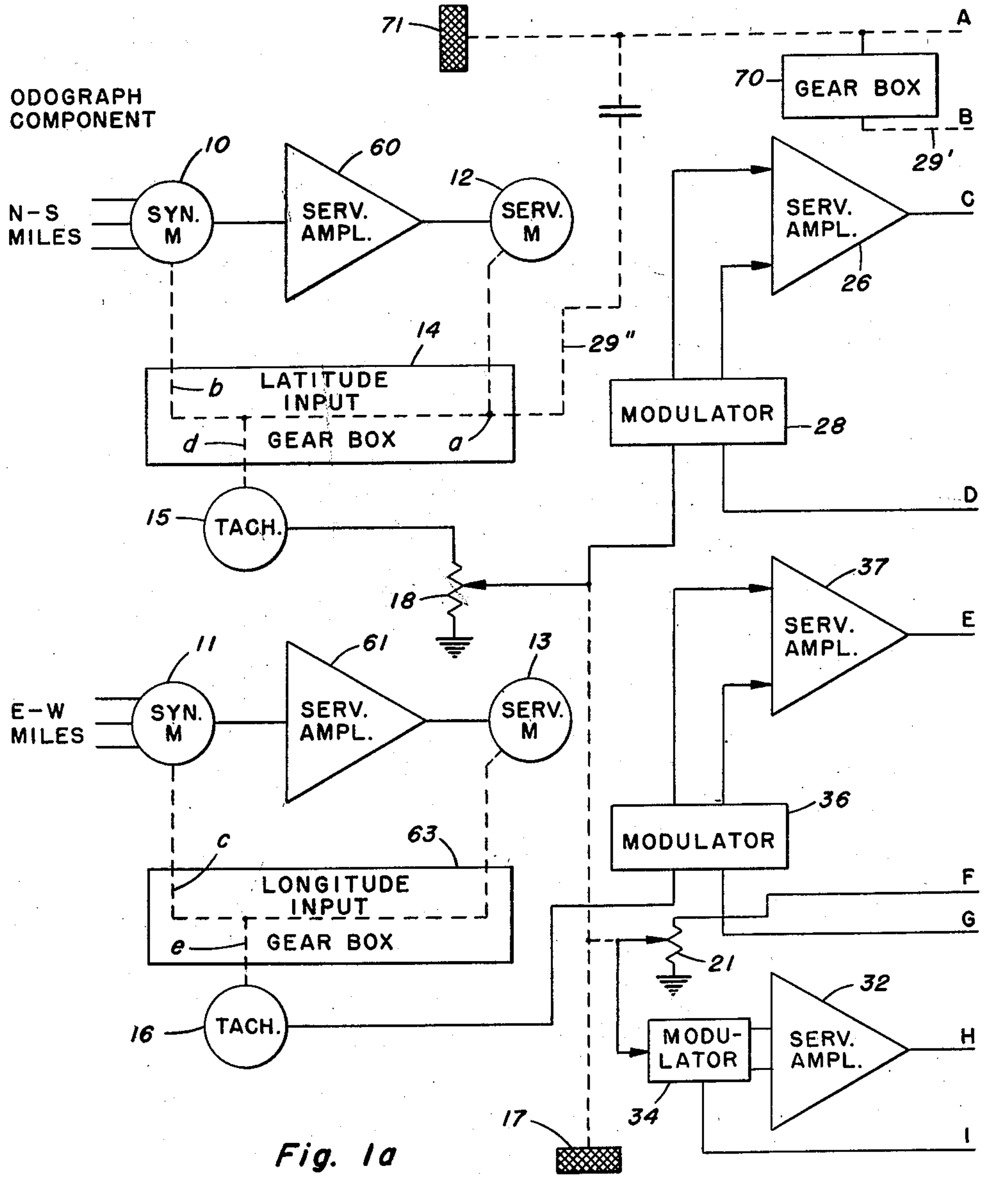
Figure 1B:
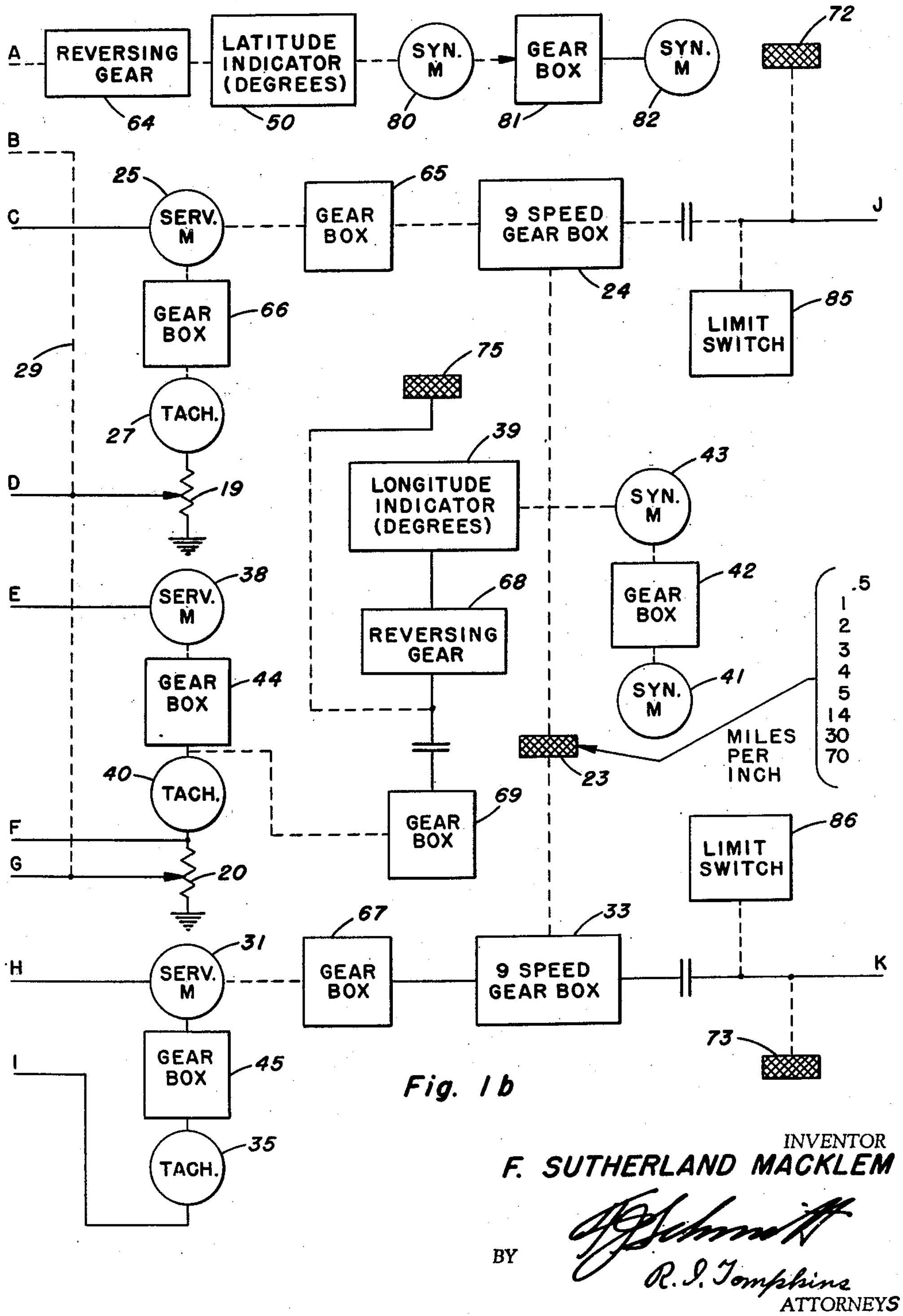
Figure 1C:
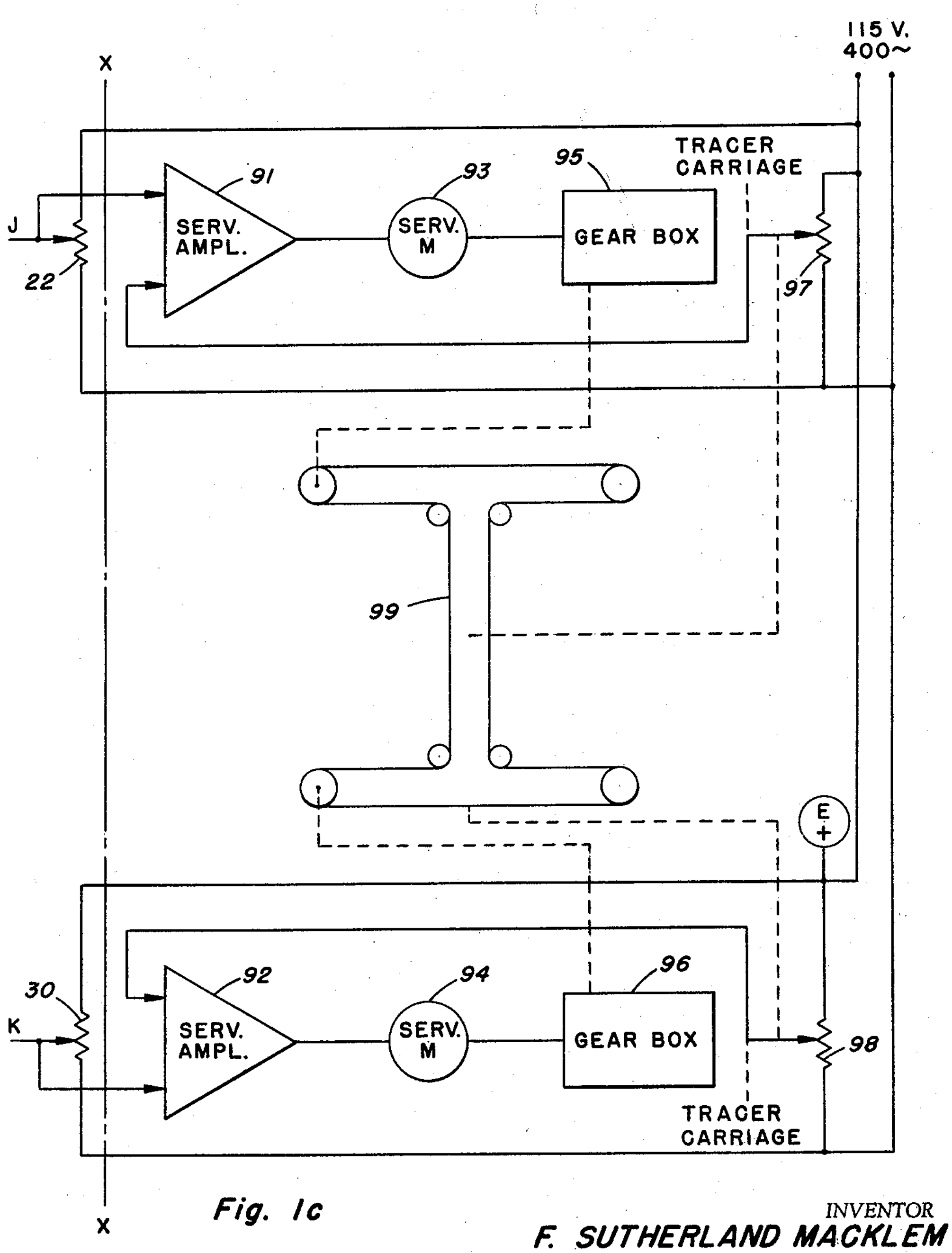

Other objects and many of the attendant advantages of this invention will be readily appreciated as the same becomes better understood by reference to the following detailed description when considered in connection with the accompanying drawings wherein:

Figs. 1A, 1B and 1C are to be taken together in that order in side by side relationship and present a partially schematic and partially block representation of a preferred embodiment of the apparatus of the invention.

Referring to the drawings it will be seen that the computer mechanism continuously receives pure displacement data representing motion of an aircraft or other vehicle, in the form of odograph components comprising a north-south component and an east-west component at the input positions indicated N–S miles and E–W miles, respectively. These data are available from separate synchro generators (not shown) and are presented to a north-south component synchro control transformers 10 and to an east-west component synchro control transformers 11. The component synchros 10 and 11 through respective servo-amplifiers 60 and 61 drive high-speed servo motors 12 and 13 respectively, at rates proportional to the respective velocities of the synchro control transformers 10 and 11. The servo loop in each case is closed through reduction gearing by means of gear boxes 14 and 63 so that motors 12 and 13 may run at relatively high speeds for relatively small input-displacement changes. For example ratios of 4500/1 may be used at *a*, 600/1 at *b* and *c* and 2.5/1 at points *d* and *e* in gear boxes 14 and 63. Tachometer means 15 and 16 may follow the slow-speed end of the reduction gearing and provide, in each case, for example, a D. C. (direct current) voltage proportional to the instantaneous north-south or east-west component of ship's velocity. A visual indication of instantaneous latitude in degrees may be provided by latitude indicator 50 which is directly mechanically driven by gear mechanism in gear box 14 through means 29″ and reversing gear unit 64. Reversing gear unit 64 may have a 4:1 ratio.

It is characteristic of the Mercator projection that the scale of miles per degree longitude varies with degrees latitude as determined by the secant of the latitude degrees (above or below the earth's equator). Therefore, it is necessary to provide a proper proportioning of the east-west and north-south chart drives to reflect this condition for the limited range of latitude at which a particular chart presentation is made. The illustrative embodiment of the apparatus shows employment of a single manual control, a manuel set for cosine of center latitude 17, for setting a "center latitude" for the chart record and the east-west and north-south chart drives are automatically further corrected for all latitude displacements above and below the center latitude. Since the secant function provides difficulties in reproduction within the latitudes of interest, the instrument utilizes the reciprocal function, at cosine potentiometers 18, 19, 20 and 21, all of which are constructed to cover the complete latitude range desired, as, for example, from 75° north to 75° south latitude. Potentiometer 18 and 21 provide the "center" latitude correction for the north-south and east-west chart drives, respectively; potentiometer 19 provides north-south-drive corrections above and below center latitude for a particular chart presentation; and potentiometer 20 provides east-west-drive control properly proportioned to the instantaneous north-south-drive (as determined by the mechanical interconnection 29 of potentiometers 19 and 20), and to the instantaneous latitude (as determined by the mechanical connections 29′ and 29″ to servomotor 12). A 40:1 ratio gear box unit 70 may be disposed in the line of mechanical connection 29′ for proper proportioning of movement.

In the form presented in the illustrative embodiment, the north-south drive derives its position data from the instantaneous setting of a potentiometer 22, which has map-scale proportioning effected by manual setting of gear box 24 by map-scale control 23. Potentiometer 22 is governed by servomotor 25 which in turn is driven by servo-amplifier 26. Amplifier 26 alternately samples, at a 400 C. P. S. (cycles per second) chopper or modulator 28, the north-south velocity component of ship's motion (as corrected at potentiometer 18 for center latitude) and a corrected version of its own feedback from tachometer 27; the correction in feedback voltage is determined by potentiometer 19, which as hereinbefore indicated, is always set to reflect the instantaneous latitude. Thus, the displacement of servomotor 25 is seen always to reflect the true latitude, as corrected for the instantaneous difference between true latitude and center latitude; and the north-south-drve potentiometer 22 follows motor 25 in proportion to the desired map scale. Appropriate gear box units 65 and 66 are provided for proper reduction gearing. Gear box unit 65 may effect a 360:1 ratio and gear box unit 66 may effect a 2.5:1 ratio.

The east-west-drive problem involves a similar solution to that of the north-south-drive because in any given Mercator plot the longitude displacements must be related to "center latitude" and to instantaneous latitude. In the illustrative embodiment shown, the east-west-drive potentiometer 30 is driven by a servomotor 31, which in turn is controlled by servo-amplifier 32; map-scale corrections being introduced through 9-speed gear box unit 33 which follows gear box unit 67 which may have 360:1 reduction gearing. The modulator 34 feeding amplifier 32 could directly accept the longitudinal component of velocity, as provided by tachometer 16 and corrected by potentiometer 21 for center latitude, for 400 C. P. S. comparison with the feedback voltage from tachometer 35, as corrected for instantaneous latitude by potentiometer 20, thus providing a circuit substantially duplicating the hereinbefore described north-south control servo circuit including elements 19, 25, 26, 27 and 28 and this is contemplated by and is within the scope of the instant invention. However, additional presentation of true longitude is required for some problems, and such information is not directly available from tachometer 16 nor is it present in the motion of servomotor 31. Hence, the illustrative embodiment performs the east-west-component computations in two stages. The first stage corrects east-west-velocity data from tachometer 16 in accordance with instantaneous latitude, and is effected by locating potentiometer 20 in the tachometer-feedback circuit of the servo system including modulator 36, servo amplifier 37 and servomotor 38; a longitudinal indication at longitude indicator 39 then becomes directly available from the displacement of servomotor 38, and the further second stage correction needed for east-west-drive control may be derived by connecting potentiometer 21 to the output of feedback tachometer 40. Gear box units 44 and 45 (2.5:1 ratio) may be disposed between servomotor 38 and tachometer 40 and between servomotor 31 and tachometer 35, respectively.

The actual positioning of the plotting stylus (not shown) may be effected by a number of possible mechanisms following the basic component input voltages at potentiometers 22 and 30. In one practical application utilized, a differential drive of the type described in copending application Serial No. 391,779 filed November 12, 1953 was employed.

To facilitate initial setting of the instrument for latitude and longitude, and for east-west and north-south positions of the plotting stylus, a number of manual controls and clutches (not numbered) are shown but are not described in detail. Thus manual control 71 provides manual set of present north-south latitude, manual control 72 provides north-south pen positioning, manual control 75 provides manual set of present east-west longitude, manual control 73 provides east-west pen positioning. Synchro generators 80 and 82 and 180:1 gear reduction unit 81 provide for remote latitude transmission indication. Synchro generators 41 and 43 and 180:1 gear reduction unit 42 provide for remote longitude transmission. Respective limit switches 85 and 86 limit rotation to 10 turns in the north-south and east-west circuits, respectively. Servo amplifiers 91 and 92, servomotors 93 and 94, potentiometers 97 and 98 may be in the rectangular plotting machine assembly unit (shown to the right of line $x$—$x$). Gear boxes 95 and 96 may provide $48\pi$ revolutions per inch of cabling for the plotting machine cabling. Exciting voltage is provided as by 115 volt, 400 cycle voltage lines as shown.

The following types of parts have been used in one successful practical application of the inventive apparatus and are given by way of illustration, but are in nowise to be construed as limiting the scope of the invention: servo amplifier 26—8 w., 400~ reluctance amplifier, servo amplifiers 91 and 92—18 w. 400~ reluctance amplifiers, modulators 28 and 36—6 v. 400~ choppers, potentiometers 97 and 98—.1% linear resisters.

Obviously many modifications and variations of the present invention are possible in the light of the above teachings. It is therefore to be understood that within the scope of the appended claims the invention may be practiced otherwise than as specifically described.

What is claimed is:

1. A navigation computer comprising: first, second, third, fourth, and fifth servo loops, each of said loops including a servo amplifier, a servo motor driven by said servo amplifier, and feedback means, the feedback means of said second, fourth, and fifth servo loops including a tachometer generator driven respectively by said second, fourth, and fifth loop servo motors, said first and third loops each having a synchro control transformer adapted to be actuated in accordance with north-south and east-west rectangular-co-ordinate data representing displacement of an aircraft, said first and third loop synchro control transformers driving said first and third loop servo amplifiers, respectively, to cause said first and third loop servo motors to be driven at rates proportional to the velocities of said synchro control transformers, reduction gearing means disposed between said first and third loop servo motors and said first and third loop synchro control transformers, respectively, first and third loop tachometer generators coupled to the low speed ends of said first and third loop reduction gearing means to provide output voltages respectively proportional to the north-south and east-west components of aircraft velocity, a first cosine potentiometer, circuit means coupling the output of said first loop tachometer generator to said first cosine potentiometer, a second cosine potentiometer, circuit means coupling the output of said second loop tachometer generator to said second cosine potentiometer, a first modulator having input circuit means connected to the wipers of said first and second cosine potentiometers and output circuit means connected to the input of said second loop servo amplifier, a north-south chart drive potentiometer, means coupling the wiper of said north-south chart drive potentiometer to said second loop servo motor to be actuated thereby, third and fourth cosine potentiometers, circuit means coupling the output of said fourth loop tachometer generator to said third and fourth cosine potentiometers, a second modulator having input circuit means connected to said third loop tachometer generator and to the wiper of said fourth cosine potentiometer and output circuit means connected to the input of said fourth loop servo amplifier, a third modulator having input circuit means connected to said fifth loop tachometer generator and to the wiper of said third cosine potentiometer and output circuit means connected to the input of said fifth loop servo amplifier, an east-west chart drive potentiometer, means coupling the wiper of said east-west chart drive potentiometer to said fifth loop servo motor to be actuated thereby, manually operable means mechanically linking the wipers of said first and third cosine potentiometers whereby center latitude correction may be made in said second and fifth servo loops, means mechanically coupling the wipers of said second and fourth cosine potentiometers to said first loop servo motor whereby instantaneous latitude correction may be made in said second, fourth, and fifth servo loops.

2. The apparatus of claim 1 including a latitude indicator following said first loop servomotor, a present latitude control disposed between said indicator and said first loop servomotor, a longitude indicator following said fourth loop servomotor, a present longitude control disposed between said fourth loop servomotor and said longitude indicator, and remote latitude and longitude transmission means respectively following said indicators.

3. The apparatus of claim 2 including a north-south pen position control and a first limit switch following said second loop servomotor, an east-west pen position control and a second limit switch following said fifth loop servomotor to effect control of said north-south and east-west chart drive potentiometers, respectively, a map scale control means interposed between said second and fifth loop servo motors and the wipers of said north-south chart drive potentiometer and said east-west chart drive potentiometer to effect correction for map scale of said drive potentiometers, a plotting stylus and drive means coupled to said drive potentiometers to effect proper relative position of said stylus with respect to a chart.

4. A navigation computer comprising: means to convert a signal proportional to the north-south displacement of an aircraft to a voltage proportional to the north-south velocity thereof, means to convert a signal proportional to the east-west displacement of an aircraft to a voltage proportional to the east-west velocity thereof, a first cosine potentiometer, circuit means to apply a voltage related to said east-west velocity voltage to said first cosine potentiometer, latitude counter means coupled to said north-south conversion means to be actuated thereby, longitude counter means, means connected to the wiper of said first cosine potentiometer to actuate said longitude counter means, north-south chart-drive means having input circuit means and output circuit means including a second cosine potentiometer, a third cosine potentiometer, circuit means applying said north-south velocity voltage to said third cosine potentiometer, circuit means connecting the wipers of said second and third cosine potentiometers to the input circuit means of said north-south chart drive means, east-west chart drive means, a fourth cosine potentiometer, circuit means to apply the voltage appearing across said first cosine potentiometer to said fouth cosine potentiometer, circuit means to connect the wiper of said fourth cosine potentiometer to said east-west chart drive means, means interconnecting the wipers of said third and fourth cosine potentiometers for manual actuation, and means coupling the wipers of said first and second cosine potentiometers to said north-south conversion means to be actuated thereby.

5. A navigation computer comprising: a first servo loop operable in response to having applied thereto rectangular co-ordinate data proportional to the north-south displacement of an aircraft to provide an output voltage proportional to the north-south velocity of the aircraft, latitude counter means coupled to said first servo loop to be actuated thereby, a first cosine potentiometer, circuit means to apply the output voltage of said first servo loop to said first cosine potentiometer, a second servo loop operable in response to having applied thereto, rectangular co-ordinate data proportional to the east-west displacement of the aircraft to provide an output voltage proportional to the east-west velocity of the aircraft, a third servo loop including a second cosine potentiometer in the output circuit thereof, circuit means connecting the wiper of said second cosine potentiometer to the input of said third servo loop, circuit means coupling the output voltage of said second servo loop to the input of said third servo loop, longitude counter means coupled to said third servo loop to be actuated thereby, a fourth servo loop including a third cosine potentiometer in the output circuit thereof, circuit means connecting the wipers of said first and third cosine potentiometers to the input of said fourth servo loop, north-south chart drive means coupled to said fourth servo loop to be actuated thereby, a fourth cosine potentiometer, circuit means to apply the voltage appearing across said second cosine potentiometer to said fourth cosine potentiometer, a fifth servo loop, circuit means connecting the wiper of said fourth cosine potentiometer to the input of said fifth servo loop, east-west chart drive means coupled to said fifth servo loop to be actuated thereby, means coupling the wipers of said second and third cosine potentiometers to said first servo loop to be conjointly actuated thereby, and manually operable means coupling the wipers of said first and fourth cosine potentiometers for conjoint actuation.

6. A navigation computer to convert rectangular co-ordinates to Mercator projection co-ordinates comprising: a north-south chart drive means, an east-west chart drive means, means operable in accordance with the north-south velocity of an aircraft to actuate said north-south chart drive means, means operable in accordance with the east-west velocity of an aircraft to actuate said east-west chart drive means, manually operable cosine potentiometer means to provide center latitude correction for said north-south chart drive actuating means and for said east-west chart drive actuating means, and cosine potentiometer means coupled to said north-south chart drive actuating means to provide instantaneous latitude correction for said north-south chart drive actuating means and for said east-west chart drive actuating means.

7. A navigation computer comprising: first servo loop means to continuously convert data proportional to the north-south displacement of an aircraft to an output voltage proportional to the north-south velocity of the aircraft, second servo loop means to continuously convert data proportional to the east-west displacement of an aircraft to an output voltage proportional to the east-west velocity of the aircraft, first and second cosine potentiometers having the wipers thereof mechanically linked for conjoint actuation, circuit means to couple the output voltages of said first and second servo loop means to said first and second cosine potentiometers, respectively, third and fourth servo loop means including third and fourth cosine potentiometers in the output circuits thereof, means coupling the wipers of said third and fourth cosine potentiometers to said first servo loop means to be conjointly actuated thereby, circuit means connecting the wipers of said first and third cosine potentiometers to the input of said third servo loop means, circuit means connecting the wipers of said second and fourth cosine potentiometers to the input of said fourth servo loop means, north-south chart drive means coupled to the output of said third servo loop means to be actuated thereby, and east-west chart drive means coupled to the output of said fourth servo loop means to be actuated thereby.

8. A navigation computer comprising: first and second servo loops each comprising a synchro control transformer respectively adapted to be actuated by rectangular co-ordinate data representing the north-south and east-west displacement of an aircraft, a servo amplifier coupled to said synchro control transformer, a servo motor coupled to said servo amplifier to be driven thereby, and a reduction gearing means coupling said servo motor to said synchro control transformer to complete the servo loop; first and second tachometer generators respectively coupled to said first and second loop reduction gearing means to be driven thereby; first and second cosine potentiometers; circuit means respectively coupling the outputs of said first and second tachometer generators to said first and second cosine potentiometers; third and fourth servo loops each comprising a servo amplifier, a servo motor coupled to said servo amplifier to be driven thereby, a tachometer generator coupled to said servo motor to be driven thereby, a cosine potentiometer, circuit means coupling the output of said tachometer generator to said cosine potentiometer, and circuit means connecting the wiper of said cosine potentiometer to the input of said servo amplifier; circuit means respectively coupling the wipers of said first and second cosine potentiometers to the inputs of said third and fourth loop servo amplifiers; means mechanically linking the wipers of said first and second cosine potentiometers to provide center latitude correction for said third and fourth servo loops; means mechanically coupling the wipers of said third and fourth loop cosine potentiometers to said first loop servo motor to provide instantaneous latitude correction for said third and fourth servo loops; north-south chart drive means coupled to said third loop servo motor to be actuated thereby; and east-west chart drive means coupled to said fourth loop servo motor to be driven thereby.

9. The navigation computer of claim 8 wherein said north-south and east-west chart drives comprise: a north-south drive potentiometer having the wiper thereof coupled to said third loop servo motor; an east-west drive potentiometer having the wiper thereof coupled to said fourth loop servo motor; a map scale control means interposed between said drive potentiometer wipers and said third and fourth loop servo motors; a plotting stylus; and drive means coupled to said drive potentiometers and to said stylus.

10. A first cosine potentiometer; means to apply a signal to said first cosine potentiometer; means to actuate the wiper of said first cosine potentiometer to accord with a first selected angular quantity; a servo loop comprising a servo amplifier, a servo motor coupled to said servo amplifier, a tachometer generator coupled to said servo motor to be actuated thereby, a second cosine potentiometer, circuit means to apply the output voltage of said tachometer generator to said second cosine potentiometer, and circuit means to connect the wiper of said second cosine potentiometer to the input of said servo amplifier; circuit means connecting the wiper of said first cosine potentiometer to the input of said servo amplifier; and means to actuate the wiper of said second cosine potentiometer to accord with a second selected angular quantity.

11. In a Mercator chart drive computer: means to convert an input signal proportional to the displacement of an aircraft to an output voltage proportional to the velocity thereof; a first cosine potentiometer; circuit means to apply said output voltage to said cosine potentiometer; means to manually actuate the wiper of said first cosine potentiometer to provide center latitude correction; servo loop means having a second cosine potentiometer connected in the output circuit thereof; means to actuate the wiper of said second cosine potentiometer in accordance with the instantaneous latitude of the aircraft to provide instantaneous latitude correction; circuit means connecting the wipers of said first and second cosine potentiometers to the input of said servo loop means; and Mercator chart drive means coupled to said servo loop means to be actuated thereby.

References Cited in the file of this patent

UNITED STATES PATENTS

| | | |
|---|---|---|
| 2,406,836 | Holden | Sept. 3, 1946 |
| 2,588,763 | Reilly | Mar. 11, 1952 |